Aug. 3, 1965  J. ROYET  3,198,687
HIGHLY EFFECTIVE THERMAL INSULATION
Filed April 17, 1961  2 Sheets-Sheet 1

INVENTOR
JEAN ROYET
By Irwin S. Thompson
ATTY.

Aug. 3, 1965              J. ROYET              3,198,687

HIGHLY EFFECTIVE THERMAL INSULATION

Filed April 17, 1961              2 Sheets-Sheet 2

INVENTOR

JEAN ROYET

BY Irwin S. Thompson

ATTY.

United States Patent Office 3,198,687
Patented Aug. 3, 1965

3,198,687
HIGHLY EFFECTIVE THERMAL INSULATION
Jean Royet, St.-Maur-des-Fosses (Seine), France, assignor to L'Air Liquide, Societe Anonyme pour l'Etude et l'Exploitation des Procedes Georges Claude
Filed Apr. 17, 1961, Ser. No. 103,284
Claims priority, application France, Apr. 27, 1960, 825,470, Patent 1,264,507; Dec. 23, 1960, 848,193
2 Claims. (Cl. 161—43)

The present invention concerns a new highly effective thermal insulation in vacuo offering high resistance to the transfer of heat by conduction and by radiation. The insulation of the invention makes it possible to produce very high temperature gradients between a hot surface and a cold surface, and is applicable more especially from this viewpoint to the thermal insulation of receptacles having a very low internal temperature, notably for liquefied gases.

It is known that it is difficult to heat-insulate receptacles for liquefied gases, such as the lower hydrocarbons, oxygen, nitrogen and hydrogen, in such manner as to reduce to a low value the losses of these gases by vaporation under the effect of the admission of heat without excessively increasing their overall dimensions by reason of the necessary thickness of insulation. There has already been proposed as thermal insulation a system of substantially parallel reflecting screens separated by a fabric formed of fibres having low thermal conductivity, such as glass wool, the whole system being maintained under a vacuum. While the daily losses by evaporation of gases such as oxygen or nitrogen in the liquid state can be reduced to an acceptable level by such thermal insulation, it does not make it possible to envisage their preservation without utilisation for long periods of time.

In addition, it is still unsatisfactory for storing more highly volatile gases, such as hydrogen, in the liquid state.

In contradistinction thereto, the present invention makes it possible to reduce to an extremely low value the penetration of heat into a receptacle for liquefied gas, even of very high volatility, without necessitating the use of excessive thicknesses of thermal insulation. The thermal insulation of the invention comprises, in the same way as the aforesaid known insulators, substantially parallel reflecting screens separated by layers of fibres consisting of a material having low thermal conductivity. It is characterised in that voids are left between the weft and warp filaments of the fabric.

Without any claim to a complete explanation of the transmission of heat through a material conforming to the above definition, it will be appreciated that this material offers very high resistance to the transmission of heat both by conduction and by infra-red radiation.

The transmission of heat from one screen to another by conduction can take place only through fibres in contact with both screens. Now, it will be appreciated that, owing to the ordered arrangement of these fibres in the form of filaments substantially parallel to the screens, the path which must be followed by the heat from one screen to another is very long, because it is highly improbable that an insulating fibre in contact with one face of an undulation or boss on one screen will come into contact, in a region in the neighborhood of this point, with the opposite face of an undulation or boss on the other screen. As a general rule, the thermal flux will have to be propagated along this fibre over a great length, or pass from this fibre to another fibre, and then to another one, and so on, through a series of contact zones in quasi-point form, which thus offers high resistance to the passage of heat, before reaching an undulation or boss on the other screen, at a great distance from the point of contact with the first screen.

On the other hand, owing to the fact that only a small part of the volume present between the screens is occupied by the fibre fabric, while the remainder of the said volume remains empty, the absorption of the infra-red radiation by the fibres is reduced to a minimum, whereby almost complete reflection of the radiation from the hotter screen is ensured.

A number of embodiments of the invention are possible by which the effectiveness of the insulation can be even further increased.

In particular, the weft and the warp of the fabric are formed of filaments consisting of twisted fibres, of which the pitch is substantially different from the mesh of the fabric. The mesh of the fabric is advantageously made substantially smaller than the wavelength of the largest of the undulations. On the other hand, the diameter of the fibres of the fabric must also be as small as possible, for example of the order of a micron, and the number of fibres per filament must be sufficient, for example several tens.

In addition, the space between two adjacent reflecting screens may be occupied, not only by the aforesaid lacunar structure, but also by a felt formed with fibers of a material having low thermal conductivity, which occupies the volume subsisting between the reflecting screens and the fabric. This improvement makes it possible, while preserving the thermal insulating properties of the material of the invention, to improve the useful life of the screens and their mechanical strength, and in particular to avoid any thermal short-circuit as a result of two adjacent screens being brought into contact due to the deformation resulting from their positioning.

The fabric is then preferably disposed approximately half-way between two adjacent reflecting screens, within the felt, or a sheet of fabric is disposed in contact with each of the opposed faces of two reflecting screens, outside the felt.

In accordance with another preferred embodiment, the reflecting screens comprise bosses regularly alternating on one face and the other, and formed with holes in their end. The presence of these holes facilitates the degassing and the maintenance in vacuo during service, as compared with the structure comprising only imperforate screens.

A number of practical forms of thermal insulation in vacuo according to the invention for receptacles for liquefied gases are hereinafter described as non-limiting examples with reference to the accompanying drawings.

FIGURE 1 of the drawings diagrammatically illustrates in section the interval between two consecutive reflecting screens of the insulation, which are separated by a fibre fabric.

Figure 6:
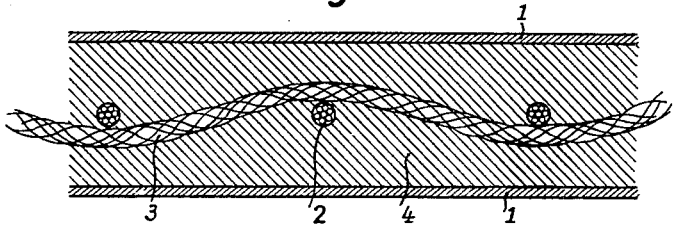

FIGURE 6 of the drawings diagrammatically illustrates in section the interval between two consecutive reflecting screens of the insulation with a glass fibre fabric and a glass fibre felt; the glass fibre fabric is single and is situated in a plane parallel of the screens and equidistant from the latter.

Figure 7:
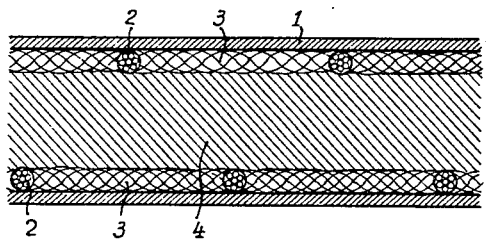

FIGURE 7 illustrates another embodiment, in which each panel comprises two glass fibre fabrics disposed or stuck on the screens; situated between these two fabrics is filling of glass fibre felt stuck, if desired, to the screens.

Figure 8:
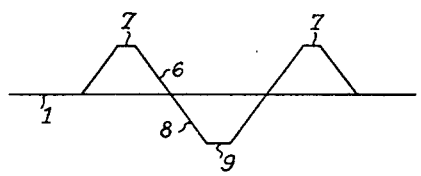

FIGURE 8 is a detailed illustration of perforated bosses in the wall of the screens, through which a vacuum may be formed.

Figure 9:
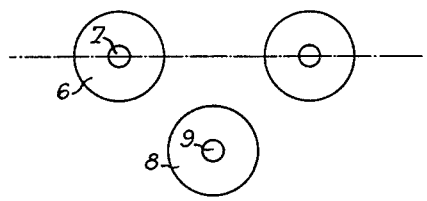

FIGURE 9 is a plan view corresponding to FIGURE 8.

Figure 10:
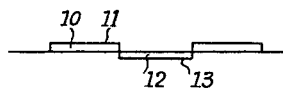

FIGURE 10 is a detailed view of a modified form comprising slotted folds in the wall of the screens, through which the vacuum can be formed.

Figure 11:
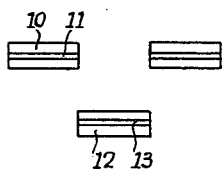

FIGURE 11 is a plan view corresponding to FIGURE 10.

Figure 1:
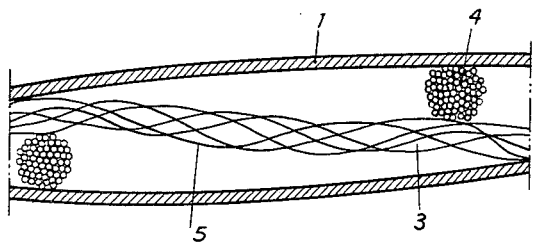
Figure 2:
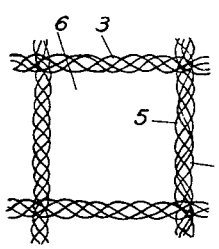
FIGURE 2 is a plan view of a mesh of the said fabric.
Figure 3:
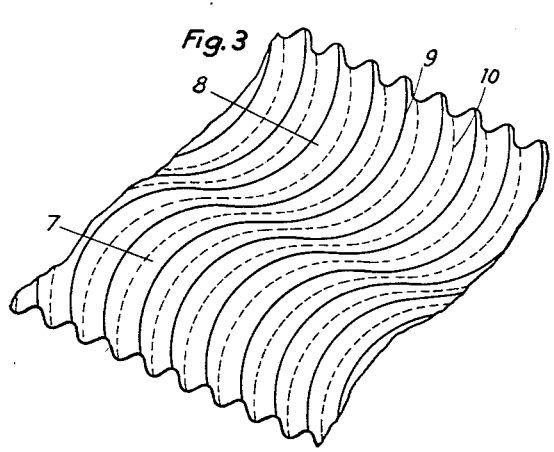
FIGURE 3 illustrates in perspective a portion of a reflecting screen having a double undulation, the undulations of short wavelength having been, however, enlarged for the sake of clarity.

The thermal insulation illustrated in FIGURES 1 to 3 is composed of screens 1 consisting of polished aluminum sheets having double undulations, which screens are separated by a layer of glass fibre. However, in order further to increase the resistance to the transfer of heat, the successive screens may be separated at least in the coldest zone of the insulation by two layers of glass fabric.

The wavelength of the larger of the undulations of the polished aluminum screens is 1 cm., and its amplitude is 5 mm. The wavelength of the smaller of the undulations is 0.64 mm., and its amplitude 32 microns. The thickness of the sheet is 8 microns.

The glass fibre fabric is composed of weft threads 3 and warp threads 4 each comprising about forty fibres about 3 microns in diameter and forming a mesh of 0.25 mm. These fibres 5 are twisted, and their pitch is different from the mesh of the fabric. In FIGURE 1, only five fibres of the weft thread 3 have been shown, in order that their twisted arrangement may be more clearly apparent. The mesh thus formed comprises a wide empty central zone 6 which imparts to the fabric a very lacunar structure and a very low apparent density. The thickness of this fabric is about 0.025 mm.

FIGURE 3 illustrates in perspective the general appearance of a fragment of a reflecting screen having a surface formed with double undulations, the undulations of large wavelength forming parts in relief 7 and depressions 8, and the undulations of short wavelength forming parts in relief 9 and depressions 10. The amplitude of the small undulations have been illustrated for the sake of simplicity as having a rectilinear profile after development of the larger undulations. It is naturally possible to give them any other appropriate profile, for example, a sinusoidal profile. In any case, the compressive strength of a screen having a double undulation of this type is about four times that of a similar screen having only one system of undulations.

If 35 reflecting screens and 70 glass fibre fabrics are stacked—two layers of fabric between two consecutive screens—an insulation having a total thickness of 2.5 to 5 mm., depending upon the applied load, is obtained. This insulation can be rapidly placed under a vacuum of $10^{-5}$ mm. Hg, because it gives up the occluded gases much more readily than the known insulations, owing to its very lacunar structure. It has excellent compressive strength and good flexibility, and can therefore be applied around receptacles of undevelopable form. In particular, it can be very readily fitted around the spherical ends of receptacles having a cylindrical body, in contradistinction to known insulators comprising reflecting screens.

The coefficient of heat transmission of this insulation is 0.15 microwatt/cm./d.° K. between ambient temperature and 77° K. It is about ten times lower than that of an insulation formed with reflecting screens having a plane surface and with sheets formed of glass fibres of disordered structure.

Figure 4:
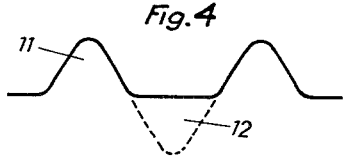
FIGURE 4 illustrates a portion of a reflecting screen provided with bosses, as seen in section, and FIGURE 5 the same portion as seen from above.
Figure 5:
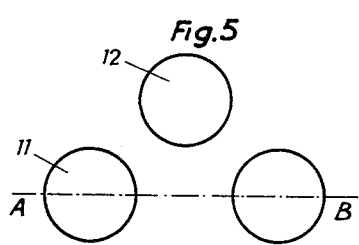

The embodiment of a reflecting screen as diagrammatically illustrated in FIGURES 4 and 5 comprises bosses extending alternatively in one direction and the other and disposed regularly in quincuncial form, such as the upwardly extending bosses 11 and the downwardly extending bosses 12 in FIGURE 4, which is a section along the line AB of FIGURE 5. These bosses perform the same function as the undulations of short wavelength in the screens previously described.

The thermal insulation illustrated in FIGURES 6 and 7 is composed of plane screens 1 consisting of polished sheet aluminum of a thickness of from 8 to 10 microns. The felt 4 consisting of glass fibres is composed of fibres about 1 micron in diameter. Its total thickness, i.e. the distance between the inside faces of the two screens, may vary from 1/10 mm. to 5 mm., depending upon the applications.

The glass fibre fabric composed of weft threads 2 and warp threads 3. The mesh of the fabric is about 3 mm. in the construction of FIGURE 6 and about 0.25 mm. in the construction of FIGURE 7.

The weft threads 2 and the warp threads 3 each comprise a large number of twisted fibres. The diameter of the weft and warp threads varies from 5 to 10 microns.

The screens illustrated in FIGURES 8 to 11 are preferably so perforated that the surface of the holes does not exceed 10% of the total surface of the screen.

The diameter of the holes is of the order of 0.1 to 0.3 mm. These holes 7 and 9 can be seen at the ends of the bosses 6 and 8 in FIGURES 8 and 9.

FIGURES 10 and 11 illustrates a modification comprising folds 10 and 12 in the surface of the screens. These folds are formed with slots 11 and 13 whose surface does not exceed 10% of that of the screens.

The holes 7 and 9 and the solts 11 and 13 make it possible to maintain a vacuum of the order of $10^{-3}$ mm. Hg between screens during service by known means.

Although the insulation described by way of example in the foregoing consist of aluminum screens separated by layers of glass fibre fabric, it will be appreciated that the invention is not limited to the use of such materials. Sheets of any other metal in the polished state, more especially copper, tin or silver, or even very thin sheets of a metallised flexible material, may be employed. Likewise, the glass fibres may be replaced by fibres of any other material which has low thermal conductivity. The invention also includes the receptacles for gases liquefied at low temperature which are thermally insulated by means of this insulation.

What I claim is:

1. A thermal insulation structure in vacuo, for low temperature service, comprising substantially parallel radiation-reflecting screens and separating means for said radiation-reflecting screens consisting of a woven fabric whose threads are made of filament formed each one of several tens of twisted fibres of a low thermal conductivity, of a diameter of around one micron, and of a pitch substantially different of the mesh of the fabric, said fabric being loosely woven so that substantial voids are left between the weft threads and between the warp threads of the fabric.

2. A thermal insulation structure in vacuo, for low temperature service, comprising substantially parallel radiation-reflecting thin polished aluminum sheets and separating means for said rediation-reflecting sheets consisting between each pair of consecutive screens of two layers of a woven fabric whose threads are made of filaments formed each one of several tens of twisted glass fibres of a diameter of around one micron and of a pitch substantially different from the mesh of the fabric, said fabric being loosely woven so that substantial voids are left betwen the weft threads and between the warp threads of the fabric, and said thermal insulation structure when put under a residual pressure of about $10^{-5}$ mm. having a heat transmission coefficient of about 0.15 microwatt/cm./d.° K. between ambient temperature and 77° K.

References Cited by the Examiner

UNITED STATES PATENTS

| | | | |
|---|---|---|---|
| 1,186,572 | 6/16 | Guibert | 161—407 |
| 1,956,323 | 3/34 | Gregg | 154—45 |
| 1,983,617 | 12/34 | Ladon | 161—71 |
| 2,726,977 | 12/55 | See et al. | 154—44 |
| 2,930,105 | 2/60 | Budd. | |
| 2,985,106 | 5/61 | Rhudy | 154—44 |

EARL M. BERGERT, *Primary Examiner.*

MORRIS SUSSMAN, CARL F. KRAFFT, *Examiners.*